C. F. R. VON KOCH.
METHOD OF AND FURNACE FOR SECURING PRODUCTS OF REACTION BY ELECTRIC DISCHARGES IN GASES.
APPLICATION FILED SEPT. 11, 1912.
1,085,440.  Patented Jan. 27, 1914.
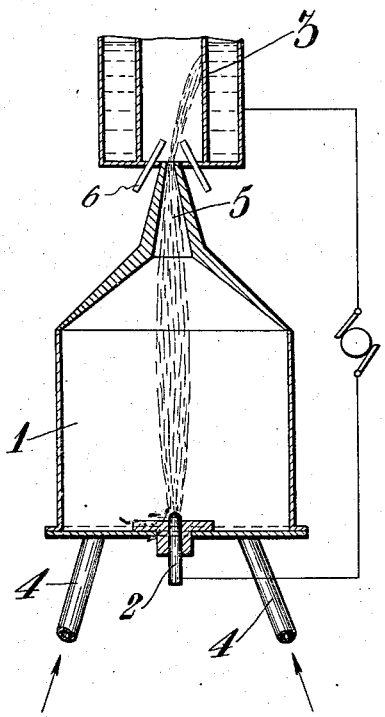
Witnesses.
Fredr. Nordsjö.
Karl F. Puneskog.
Inventor.
Carl Fabian Richert von Koch

UNITED STATES PATENT OFFICE.

CARL FABIAN RICHERT von KOCH, OF STOCKHOLM, SWEDEN.

METHOD OF AND FURNACE FOR SECURING PRODUCTS OF REACTION BY ELECTRIC DISCHARGES IN GASES.

1,085,440. Specification of Letters Patent. Patented Jan. 27, 1914.

Application filed September 11, 1912. Serial No. 719,702.

*To all whom it may concern:*

Be it known that I, CARL FABIAN RICHERT VON KOCH, subject of the King of Sweden, and resident of Stockholm, Sweden, have invented new and useful Improvements in Methods of and Furnaces for Securing Products of Reaction by Electric Discharges in Gases, of which the following is a specification, reference being had to the drawing accompanying and forming a part hereof.

In using the electric arc flame for producing compounds of oxygen and nitrogen, or other chemical compounds being at high temperatures liable to quickly decompose, it is of importance to rapidly cool the highly heated products of reaction formed in and around the arc flame. In the methods of this kind hitherto technically used, such a cooling is usually effected by supplying a great surplus of gas to the arc flame so as to cause a comparatively strong cooling to take place, whereby the reduced concentration effected by the great surplus of gas also contributes to prevent the decomposition.

The object of this invention is to gain an increased output of products of reaction and a higher concentration of the said products than could hitherto be obtained.

The invention consists, chiefly, in this that the discharge is caused to take place through a gas passage opening into a cooler, said passage being so narrow that the gases passing through the same will issue with a great speed into the cooler. Preferably, the said passage is made so narrow that its cross-sectional area is considerably smaller than that of the arc flame in the wider part of the furnace. Thus, if the diameter of the flame in the wider part of the furnace is, for instance, 2 inches, the discharge is suitably caused to take place through a passage of a width of ⅜ or ⅔ of an inch, or still less. By taking certain precautions hereinafter set forth the strong arc flame may be caused to extend through such a narrow passage without the walls around the same being melted or injured, as would be expected.

The invention further comprises the construction and combination of parts hereinafter set forth.

In the drawing, I have shown diagrammatically in what manner my improved method may be carried into effect.

Referring to the drawing, an electric discharge is shown to take place in the chamber 1 between two electrodes 2 and 3 one of which, viz. 3, is surrounded by water and forms a cooler. The gas to be treated is supplied through pipes or tubes 4 and passes through the chamber 1, provided at its upper end with a narrow passage 5, and through the said passage into the cooler 3. The passage 5 is so narrow that the gases issue into the cooling chamber with a medium speed of some hundred yards per second. If necessary, cooler gases or other cooling means may be supplied to the said chamber for instance by means of one or more pipes 6. At all events, any surplus of gas supplied to the chamber 1, or the chamber 3, respectively, need only be used in comparatively small quantities, so that the products of reaction obtained in the cooling chamber 3 through the discharges in the gas will have a high concentration. The products of reaction coming from the cooler may be utilized by absorption or otherwise.

The cross-sectional area of the electric arc flame is made narrower in the passage 5. The arc will be comparatively short in relation to electromotive force and current strength, and when it has passed the narrow opening it usually has the appearance of a broom or fan. In order to keep the discharge constant I suitably use the arrangement described in my prior application for Patent No. 615,700, filed the 20th March, 1911.

The cooling in the chamber 3 may be effected by gas (such as air), water, cooling surfaces or a combination of two or more of such means. Such a cooling by means of gas is suitably effected by supplying to the cooling chamber a surplus of a certain gas necessary for the reaction. Thus, for instance, in oxidizing the nitrogen of the air it is advantageous to supply a gas rich in oxygen to the cooling chamber.

The narrow passage 7 may be formed as a conical pipe, as an opening in a disk or plate covering the furnace chamber, or as a short nozzle through which the gases pass into the cooler. The walls around the said passage are preferably made of refractory material.

The wider chamber of the furnace, through which the gases pass before they enter into the narrow part, need only have the length necessary for heating the gases to a sufficiently high temperature. In most cases a comparatively short length will suffice.

The opening need not be circular in shape but, if desired, it may be oblong in cross-section, or it may have any other suitable shape. It has proved to be advantageous at first to make the opening somewhat too narrow and of a highly refractory or well cooled material. The arc will then burn or melt the edge or inner wall to a small extent so that the size and shape of the opening are influenced by the arc.

In using cooler gases (such as air or steam) in the cooling chamber, if desired in combination with other cooling means, it has proved to be advantageous to give the said gas a tangential direction, by which the gases will obtain a rotary or whirling movement. The narrow opening may be so arranged in relation to the cooling chamber as to lie in the middle of the gas eddy arising therein, or eccentrically thereto.

If desired, solid or liquid particles, such as pulverous catalytically acting bodies or drops of liquid, may be added to the cooling gases for instance through the pipe or pipes 6. The cooler gas and the additions thereto may serve merely for cooling or diluting the furnace gases, or enter into reaction with said gases, or favorably influence the reactions.

I claim:

1. The method of securing products of reaction in gases, which consists in causing gases to pass from a heating chamber into a cooler through so narrow a passage that the gases will issue with a great speed into the cooler, and causing electric discharges to take place through the said opening.

2. The method of treating gases, which consists in causing gases to pass from a heating chamber into a cooler through so narrow a passage that the gases will issue with a great speed into the cooler, causing electric discharges to take place through the said opening into the cooler, and supplying to the gases issuing into the cooler a gas which enters into reaction with the former.

3. The method of treating gases, which consists in creating an arc flame extending from a heating chamber into a cooler, and causing gases to pass from the said heating chamber into the cooler through an opening whose cross-sectional area is considerably smaller than that of the part of the arc flame within the heating chamber.

4. The method of treating gases, which consists in creating an arc flame extending from a heating chamber into a cooler through a narrow opening the size of which is somewhat increased by the flame itself, and supplying gases from the said heating chamber through the said opening into the cooler.

5. The method of treating gases, which consists in creating an arc flame extending from a heating chamber through a narrow opening into a cooler, supplying gases from the said heating chamber through the said opening into the cooler, and supplying to the gases issuing into the cooler a cooler gas having a whirling movement.

6. The method of treating gases, which consists in creating an arc flame extending from a heating chamber through a narrow opening into a cooler, supplying gases from the said heating chamber through the said opening into the cooler, and supplying to the gases issuing into the cooler a cooler gas containing particles acting to increase the output.

7. In a furnace for treating gases, the combination of a heating chamber having a supply opening and a small outlet opening, a second chamber communicating through the said outlet opening with the said heating chamber, and means for creating an electric arc flame extending from within the heating chamber through the said opening into the second chamber.

8. In a furnace for treating gases, the combination of a heating chamber having a supply opening and a small outlet opening, a second chamber communicating through the said outlet opening with the said heating chamber, means for creating an electric arc flame extending from within the heating chamber through the said opening into the second chamber, and means for cooling the products therein.

9. In a furnace for treating gases, the combination of a heating chamber having a supply opening and a small outlet opening, a cooling chamber communicating through the said opening with the heating chamber, an electrode in the said heating chamber, a second electrode in the cooling chamber, means for creating an electric discharge between the said electrodes, and means for cooling the electrode in the said chamber.

CARL FABIAN RICHERT von KOCH.

Witnesses:
 FRED. NORDSJD,
 KARL RUNCSKOG.

Copies of this patent may be obtained for five cents each, by addressing the "Commissioner of Patents, Washington, D. C."